(12) United States Patent
Park et al.

(10) Patent No.: US 11,232,735 B2
(45) Date of Patent: Jan. 25, 2022

(54) METHOD OF DRIVING DISPLAY PANEL AND DISPLAY APPARATUS FOR PERFORMING THE SAME

(71) Applicant: Samsung Display Co., LTD., Yongin-si (KR)

(72) Inventors: Sehyuk Park, Seongnam-si (KR); Hyo Jin Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/251,198

(22) PCT Filed: May 30, 2019

(86) PCT No.: PCT/KR2019/006541
§ 371 (c)(1),
(2) Date: Dec. 10, 2020

(87) PCT Pub. No.: WO2019/240412
PCT Pub. Date: Dec. 19, 2019

(65) Prior Publication Data
US 2021/0272495 A1   Sep. 2, 2021

(30) Foreign Application Priority Data

Jun. 14, 2018   (KR) .................. 10-2018-0068371

(51) Int. Cl.
*G09G 3/20* (2006.01)
(52) U.S. Cl.
CPC ......... *G09G 3/20* (2013.01); *G09G 2310/027* (2013.01); *G09G 2320/103* (2013.01)

(58) Field of Classification Search
CPC ............... G09G 3/20; G09G 2310/027; G09G 2320/103; G09G 2340/0435;
(Continued)

(56) References Cited

U.S. PATENT DOCUMENTS

| 9,865,231 B2 | 1/2018 | Kim et al. |
| 2011/0199287 A1 | 4/2011 | Benjamin et al. |

(Continued)

FOREIGN PATENT DOCUMENTS

| KR | 1020090127690 | 12/2009 |
| KR | 1020160015451 | 2/2016 |

(Continued)

OTHER PUBLICATIONS

International Search Report—PCT/KR2019/006541 dated Sep. 9, 2019.

*Primary Examiner* — Andrew Sasinowski
(74) *Attorney, Agent, or Firm* — Cantor Colburn LLP

(57) ABSTRACT

A method of driving a display panel includes determining whether an input data signal represents a moving image or a static image, determining an image transition from a first static image to a second static image when the input data signal represents the static image, determining a number of afterimage compensation frames using data of the first static image and data of the second static image when the image transition occurs and inserting the afterimage compensation frames corresponding to a determined number of the afterimage compensation frames in a single low frequency driving cycle between a first normal frame corresponding to the first static image and a second normal frame corresponding to the second static image.

20 Claims, 9 Drawing Sheets

(58) Field of Classification Search
CPC .. G09G 2320/0247; H04N 5/205; H04N 5/14; H04N 7/01; H04N 5/147; H04N 7/0135
See application file for complete search history.

(56) References Cited

U.S. PATENT DOCUMENTS

| | | | | |
|---|---|---|---|---|
| 2012/0086740 | A1* | 4/2012 | Murai | G09G 3/3648 |
| | | | | 345/690 |
| 2018/0304151 | A1* | 10/2018 | Hicks | G09G 5/12 |
| 2019/0114458 | A1* | 4/2019 | Cho | G06K 9/2027 |
| 2019/0147798 | A1* | 5/2019 | Hwang | G09G 3/3233 |
| | | | | 345/691 |

FOREIGN PATENT DOCUMENTS

| | | |
|---|---|---|
| KR | 1020160022450 | 3/2016 |
| KR | 1020180002092 | 1/2018 |

* cited by examiner

FIG. 4

| PDCR (%) | NUMBER OF COMPENSATION FRAMES |
|---|---|
| < 10 | 6 |
| 10 ~ 23 | 10 |
| 23 ~ 35 | 15 |
| 35 ~ 50 | 30 |
| 50 < | 60 |

FIG. 7

| \| DM1 - DM10 \| | NUMBER OF COMPENSATION FRAMES |
|---|---|
| < 15 | 6 |
| 15 ~ 40 | 10 |
| 40 ~ 80 | 15 |
| 80 ~ 150 | 30 |
| 150 < | 60 |

FIG. 9

| PDCR(%) | INITIAL NUMBER OF COMPENSATION FRAMES | \|DM1 - DM10\| | COMPENSATION FACTOR | FINAL NUMBER OF COMPENSATION FRAMES |
|---|---|---|---|---|
| < 10 | 6 | < 15 | 1 | 6 |
| | | 15 ~ 40 | 1.1 | 7 |
| | | 40 ~ 80 | 1.2 | 7 |
| | | 80 ~ 150 | 1.35 | 8 |
| | | 150 < | 1.5 | 9 |
| 10 ~ 23 | 10 | < 15 | 1 | 10 |
| | | 15 ~ 40 | 1.1 | 11 |
| | | 40 ~ 80 | 1.2 | 12 |
| | | 80 ~ 150 | 1.35 | 14 |
| | | 150 < | 1.5 | 15 |
| 23 ~ 35 | 15 | < 15 | 1 | 15 |
| | | 15 ~ 40 | 1.1 | 17 |
| | | 40 ~ 80 | 1.2 | 18 |
| | | 80 ~ 150 | 1.35 | 20 |
| | | 150 < | 1.5 | 23 |
| 35 ~ 50 | 30 | < 15 | 1 | 30 |
| | | 15 ~ 40 | 1.1 | 33 |
| | | 40 ~ 80 | 1.2 | 36 |
| | | 80 ~ 150 | 1.35 | 41 |
| | | 150 < | 1.5 | 45 |
| 50 < | 60 | < 15 | 1 | 60 |
| | | 15 ~ 40 | 1.1 | 60 |
| | | 40 ~ 80 | 1.2 | 60 |
| | | 80 ~ 150 | 1.35 | 60 |
| | | 150 < | 1.5 | 60 |

METHOD OF DRIVING DISPLAY PANEL AND DISPLAY APPARATUS FOR PERFORMING THE SAME

This application is a U.S. national phase application of International Patent Application No. PCT/KR2019/006541 which claims priority to Korean Patent Application No. 10-2018-0068371, filed on Jun. 14, 2018, and all the befits accruing therefrom under 35 U.S.C. § 119, the content of which in its entirety is herein incorporated by reference.

BACKGROUND

1. Field

Embodiments of the invention relate to a method of driving a display panel and a display apparatus for performing the method. More particularly, embodiments of the invention relate to a method of driving a display panel reducing a power consumption and enhancing a display quality and a display apparatus for performing the method.

2. Description of the Related Art

A method to minimize a power consumption of an information technology ("IT") product such as a tablet personal computer ("PC") and a notebook PC is being studied.

To minimize the power consumption of the IT product which includes a display panel, a power consumption of the display panel may be minimized. When the display panel displays a static image, the display panel may be driven in a relatively low frequency so that the power consumption of the display panel may be reduced.

SUMMARY

When a display panel is driven in a relatively low frequency and an image transition from a first static image to a second static image occurs, an after image may occur in which a previous image remains.

Embodiments of the invention provide a method of driving a display panel capable of reducing a power consumption and enhancing a display quality.

Embodiments of the invention also provide a display apparatus for performing the method.

In an embodiment of a method of driving a display panel, the method includes determining whether an input data signal represents a moving image or a static image, determining an image transition from a first static image to a second static image when the input data signal represents the static image, determining a number of afterimage compensation frames using data of the first static image and data of the second static image when the image transition occurs and inserting the afterimage compensation frames corresponding to a determined number of the afterimage compensation frames in a single low frequency driving cycle between a first normal frame corresponding to the first static image and a second normal frame corresponding to the second static image.

In an embodiment, the number of the afterimage compensation frames may be determined using a number of data changed pixels of the second static image compared to the first static image among all of pixels of the second static image.

In an embodiment, as the number of the data changed pixels is great, the number of the afterimage compensation frames may be great.

In an embodiment, the number of the afterimage compensation frames may be determined using a change of grayscale values between the first static image and the second static image.

In an embodiment, as the change of grayscale values between the first static image and the second static image is great, the number of the afterimage compensation frames may be great.

In an embodiment, the number of the afterimage compensation frames may be determined using a first average of a difference between a grayscale value of the first static image and a grayscale value of the second static image for data changed pixels of the second static image compared to the first static image.

In an embodiment, the number of the afterimage compensation frames may be determined further using a second average of a difference between a grayscale value of a current static image and grayscale values of adjacent previous static images for data changed pixels of the current static image compared to the adjacent previous static images from the current static image.

In an embodiment, the number of the afterimage compensation frames may be determined using an absolute value of a difference between the first average and the second average.

In an embodiment, the number of the afterimage compensation frames may be determined using a number of data changed pixels of the second static image compared to the first static image among all of pixels of the second static image and a change of grayscale values between the first static image and the second static image.

In an embodiment, the determining the number of the afterimage compensation frames may include determining an initial number of compensation frames based on the number of the data changed pixels of the second static image and determining a compensation factor based on the change of the grayscale values between the first static image and the second static image.

In an embodiment, the determining the number of the afterimage compensation frames may further include multiplying the initial number of the compensation frames by the compensation factor to determine a final number of compensation frames.

In an embodiment, the determining the number of the afterimage compensation frames may further include adding the compensation factor to the initial number of compensation frames to determine a final number of compensation frames.

In an embodiment of a display apparatus according to the invention, the display apparatus includes a display panel, a driving controller and a data driver. The display panel displays an image. The driving controller determines whether an input data signal represents a moving image or a static image, determines an image transition from a first static image to a second static image when the input data signal represents the static image, determines a number of afterimage compensation frames using data of the first static image and data of the second static image when the image transition occurs and inserts the afterimage compensation frames corresponding to a determined number of the afterimage compensation frames in a single low frequency driving cycle between a first normal frame corresponding to the first static image and a second normal frame corresponding to the second static image. The data driver generates a data voltage based on the data signal and outputs the data voltage to the display panel.

In an embodiment, the driving controller may include a low frequency driver which generates a first data signal having a high driving frequency when the input data signal represents the moving image and generates a second data signal having a low driving frequency when the input data signal represents the static image and a compensation frame generator which inserts the afterimage compensation frames corresponding to the determined number of the afterimage compensation frames in the single low frequency driving cycle between the first normal frame and the second normal frame and generates a third data signal when the input data signal represents the static image and the image transition occurs.

In an embodiment, the driving controller may determine the number of the afterimage compensation frames using a number of data changed pixels of the second static image compared to the first static image among all of pixels of the second static image.

In an embodiment, as the number of the data changed pixels is great, the number of the afterimage compensation frames may be great.

In an embodiment, the driving controller may determine the number of the afterimage compensation frames using a change of grayscale values between the first static image and the second static image.

In an embodiment, as the change of the grayscale values between the first static image and the second static image is great, the number of the afterimage compensation frames may be great.

In an embodiment, the driving controller may determine the number of the afterimage compensation frames using a number of data changed pixels of the second static image compared to the first static image among all of pixels of the second static image and a change of grayscale values between the first static image and the second static image.

In an embodiment, the driving controller may determine an initial number of compensation frames based on the number of the data changed pixels of the second static image and a compensation factor based on the change of the grayscale values between the first static image and the second static image.

According to the method of driving the display panel and the display apparatus, the driving frequency is determined according to the image displayed on the display panel so that a power consumption of the display apparatus may be reduced. In addition, when the image transition of the input data signal occurs in the low frequency driving mode, a proper number of afterimage compensation frames may be inserted using a first static image data and a second static image data so that the afterimage may be effectively prevented. Thus, the display quality of the display panel may be enhanced.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 4 is a table illustrating the number of compensation frames of the driving controller of FIG. 2.

FIG. 7 is a table illustrating the number of compensation frames of the driving controller of FIG. 6.

FIG. 9 is a table illustrating the number of compensation frames of the driving controller of FIG. 8.

DETAILED DESCRIPTION

Figure 1:
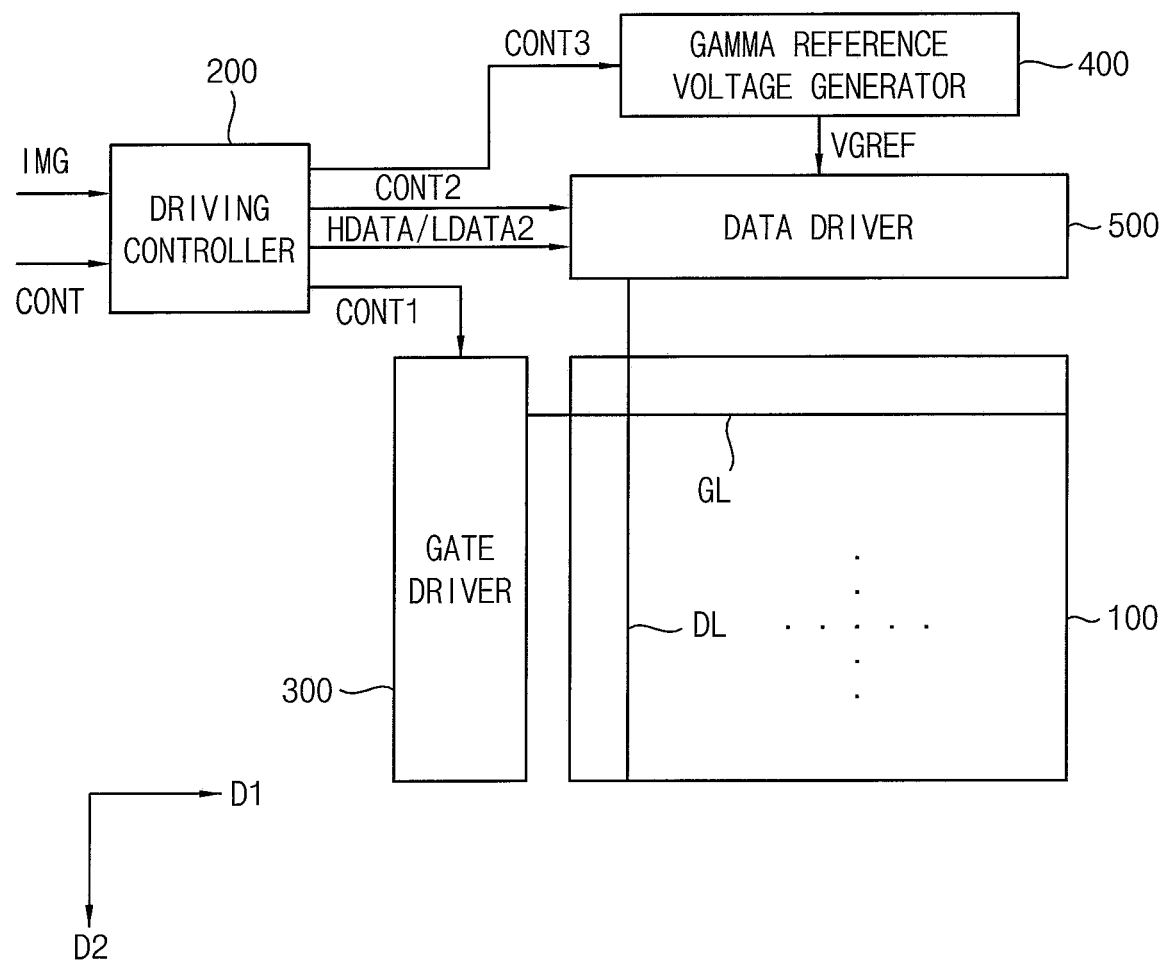
FIG. 1 is a block diagram illustrating an embodiment of a display apparatus according to the invention.

Hereinafter, the present inventive concept will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an embodiment of a display apparatus according to the invention.

Referring to FIG. 1, the display apparatus includes a display panel 100 and a panel driver. The panel driver includes a driving controller 200, a gate driver 300, a gamma reference voltage generator 400 and a data driver 500.

The display panel 100 includes a display region on which an image is displayed and a peripheral region adjacent to the display region.

The display panel 100 includes a plurality of gate lines GL, a plurality of data lines DL and a plurality of pixels electrically connected to the gate lines GL and the data lines DL. The gate lines GL may extend in a first direction D1. The data lines DL may extend in a second direction D2 crossing the first direction D1.

Each of unit pixels may include a switching element (not shown), a liquid crystal capacitor (not shown) and a storage capacitor (not shown) which are electrically connected to the switching elements. The unit pixels may be disposed in a matrix form.

The driving controller 200 receives input image data IMG and an input control signal CONT from an external apparatus (not shown). In an embodiment, the input image data IMG may include red image data, green image data and blue image data, for example. In an embodiment, the input image data IMG may include white image data, for example. In an embodiment, the input image data IMG may include magenta image data, cyan image data and yellow image data, for example. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal HDATA/LDATA2 based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal HDATA/LDATA2 based on the input image data IMG. The driving controller 200 outputs the data signal HDATA/LDATA2 to the data driver 500.

The driving controller 200 may determine whether the input image data IMG represent a moving image or a static image. The driving controller 200 may determine whether an image transition of the input image data IMG occurs.

The driving controller 200 may determine a driving frequency of the display panel 100 according to the moving image or the static image. The driving controller 200 may insert an afterimage compensation frame when the input image data IMG represent a static image and an image transition of the input image data IMG occurs.

The driving controller 200 generates the third control signal CONT3 for controlling an operation of the gamma reference voltage generator 400 based on the input control signal CONT, and outputs the third control signal CONT3 to the gamma reference voltage generator 400.

An operation of the driving controller 200 is explained referring to FIGS. 2 to 5 in detail.

The gate driver 300 generates gate signals driving the gate lines GL in response to the first control signal CONT1 received from the driving controller 200. The gate driver 300 may sequentially output the gate signals to the gate lines GL.

The gate driver 300 may be directly disposed (e.g., mounted) on the display panel 100. In an embodiment, the gate driver 300 may be connected to the display panel 100 in a tape carrier package ("TCP") form, for example. In an alternative embodiment, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal HDATA/LDATA2.

In an embodiment of the invention, the gamma reference voltage generator 400 may be disposed in the driving controller 200, or in the data driver 500.

The data driver 500 receives the second control signal CONT2 and the data signal HDATA/LDATA2 from the driving controller 200, and receives the gamma reference voltages VGREF from the gamma reference voltage generator 400. The data driver 500 converts the data signal HDATA/LDATA2 into data voltages having an analog type using the gamma reference voltages VGREF. The data driver 500 outputs the data voltages to the data lines DL.

The data driver 500 may be directly disposed (e.g., mounted) on the display panel 100. The data driver 500 may be connected to the display panel 100 in a TCP form. In an alternative embodiment, the data driver 500 may be integrated on the peripheral region of the display panel 100.

Figure 2:
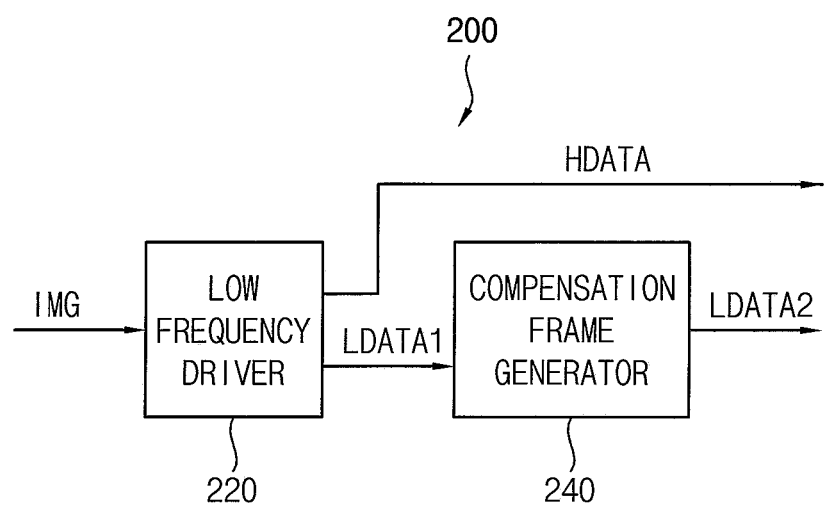
FIG. 2 is a block diagram illustrating a driving controller of FIG. 1.
Figure 3:
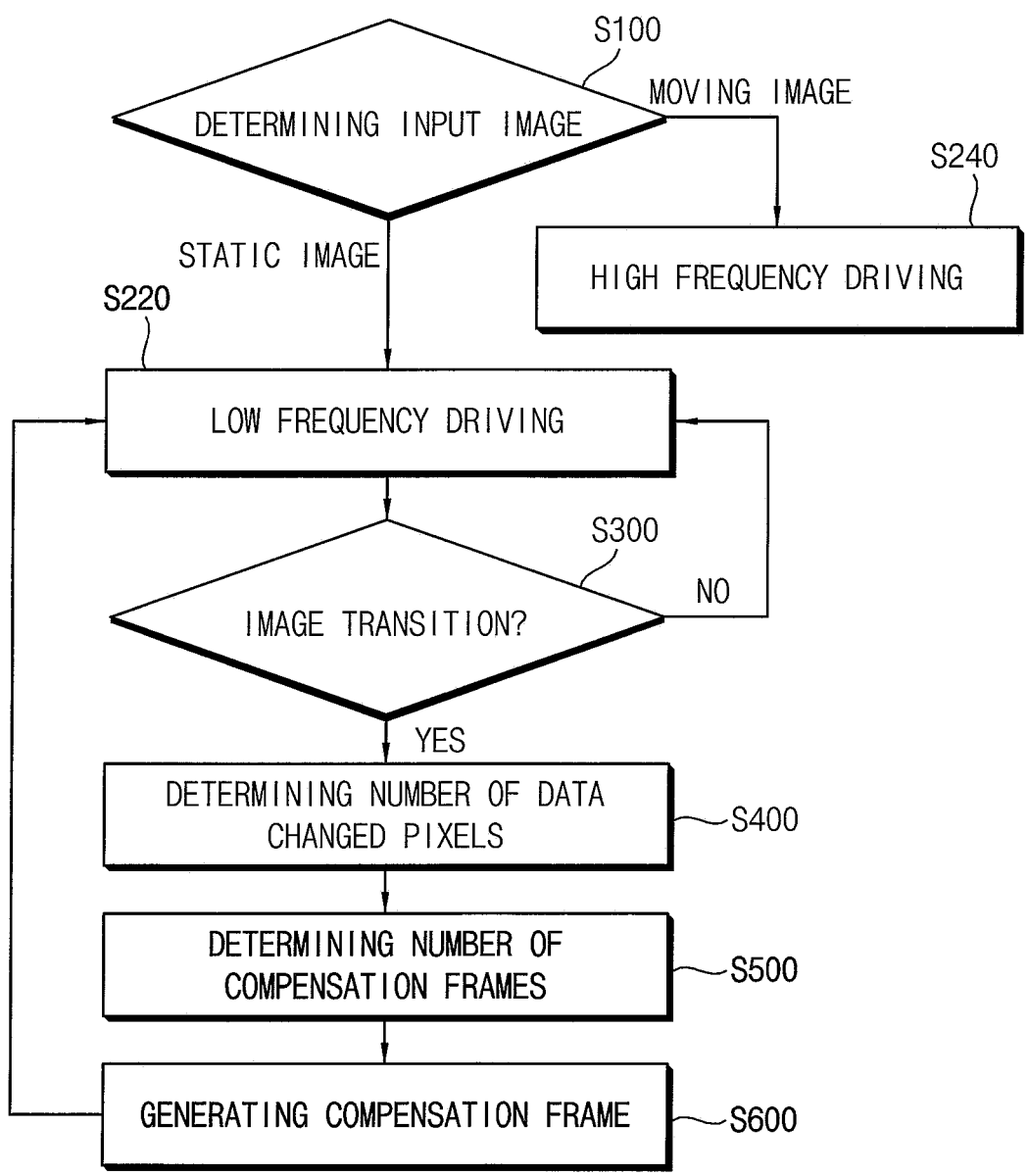
FIG. 3 is a flowchart diagram illustrating an operation of the driving controller of FIG. 2.
Figure 5:
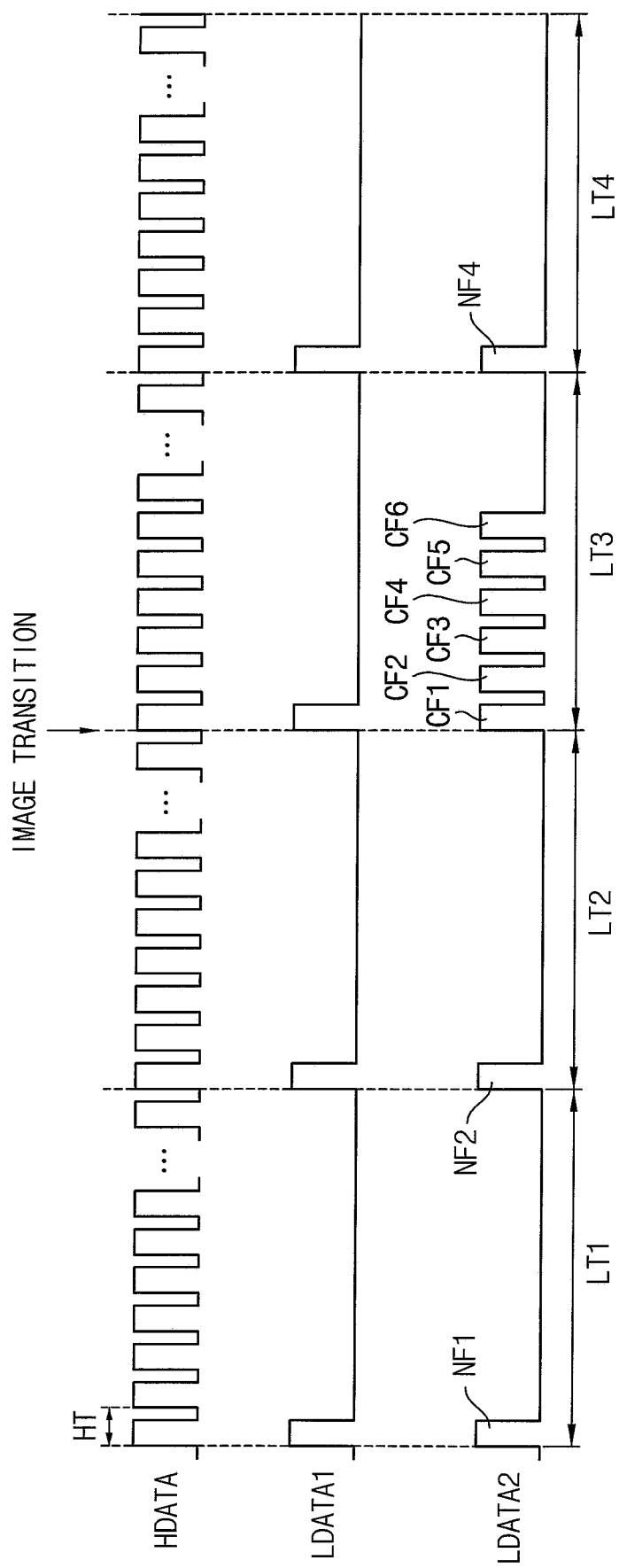
FIG. 5 is a timing diagram illustrating an output signal of the driving controller of FIG. 2.

FIG. 2 is a block diagram illustrating a driving controller 200 of FIG. 1. FIG. 3 is a flowchart diagram illustrating an operation of the driving controller 200 of FIG. 2. FIG. 4 is a table illustrating the number of compensation frames of the driving controller 200 of FIG. 2. FIG. 5 is a timing diagram illustrating an output signal of the driving controller 200 of FIG. 2.

Referring to FIGS. 1 to 5, the driving controller 200 includes a low frequency driver 220 and a compensation frame generator 240.

The low frequency driver 220 determines whether the input image data IMG represent a moving image or a static image (operation S100). In an embodiment, the low frequency driver 220 may receive plural frame images and determine a data change in the frame images to determine whether the input image data IMG represent a moving image or a static image, for example. In an embodiment, the low frequency driver 220 may sample some of pixels of the plural frame images to determine the data change in the frame images to determine whether the input image data IMG represent a moving image or a static image, for example. When the some of the pixels of the plural frame images are sampled, a memory storage for determining whether the input image data IMG represent a moving image or a static image may be reduced.

When the input image data IMG represent a moving image, the low frequency driver 220 generates a first data signal HDATA having a high driving frequency and outputs the first data signal HDATA to the data driver 500 (operation S240). In an embodiment, the high driving frequency may be about 60 Hertz (Hz), for example. In an alternative embodiment, the high driving frequency may be about 120 Hz, for example. In an alternative embodiment, the high driving frequency may be about 240 Hz, for example.

When the input image data IMG represent a static image, the low frequency driver 220 generates a second data signal LDATA1 having a low driving frequency and outputs the second data signal LDATA1 to the compensation frame generator 240 (operation S220). In an embodiment, the low driving frequency may be about 1 Hz, for example. In an alternative embodiment, the low driving frequency may be about 10 Hz, for example. In an alternative embodiment, the low driving frequency may be about 30 Hz, for example.

In an embodiment, when the input image data IMG represent a static image, the low frequency driver 220 may determine a flicker degree of the static image, for example.

When the input image data IMG represent a static image having a relatively high flicker degree, the low frequency driver 220 may generate the second data signal LDATA1 having a first low driving frequency less than a normal driving frequency (e.g. the high driving frequency of the first data signal HDATA). In an embodiment, the first low driving frequency may be about 30 Hz, for example.

When the input image data IMG represent a static image having a relatively low flicker degree, the low frequency driver 220 may generate the second data signal LDATA1 having a second low driving frequency less than the first low driving frequency. In an embodiment, the second low driving frequency may be about 10 Hz, for example.

When the input image data IMG represent a text static image including texts, the flicker degree may be very low so that the low frequency driver 220 may generate the second data signal LDATA1 having a third low driving frequency less than the second low driving frequency. In an embodiment, the third low driving frequency may be about 1 Hz, for example.

When the input image data IMG represent a static image, the compensation frame generator 240 determines whether the image transition of the input data signal occurs (operation S300). In an embodiment, the compensation frame generator 240 may determine whether the image transition of the input data signal occurs from a first static image to a second static image, for example. The second static image may be a current static image. The first static image may be a previous static image which is immediately preceding the current static image.

When the input image data IMG represent a static image and the image transition of the input image data IMG occurs, the compensation frame generator 240 determines the number of afterimage compensation frames using the first static image data and the second static image data.

In the embodiment, the compensation frame generator 240 may determine the number of data changed pixels of the second static image compared to the first static image among all of the pixels of the second static image (operation S400). The compensation frame generator 240 compares grayscale data of all pixels of the first static image to grayscale data of all pixels of the second static image. When the grayscale data of the first static image and the grayscale data of the second static image which are correspond to each other have the same value, the pixel of the second static image may not be determined as the data changed pixel. When the grayscale data of the first static image and the grayscale data of the second static image which are correspond to each other have different values, the pixel of the second static image may be determined as the data changed pixel.

In an embodiment, the compensation frame generator 240 may determine a ratio (a pixel data change rate "PDCR") of the number of the data changed pixels to the number of all pixels of the second static image, for example.

The compensation frame generator 240 determines the number of afterimage compensation frames using the number of the data changed pixels (operation S500).

As the number of the data changed pixels is great, the number of the afterimage compensation frames may be great.

FIG. 4 represents an example of the number of the afterimage compensation frames according to the ratio (PDCR) of the number of the data changed pixels to the number of all pixels of the second static image.

In an embodiment, when the ratio (PDCR) of the number of the data changed pixels to the number of all pixels of the second static image is less than about 10 percent (%), the number of the afterimage compensation frames may be set as six, for example. In an embodiment, when the ratio (PDCR) of the number of the data changed pixels to the number of all pixels of the second static image is equal to or greater than about 10% and less than about 23%, the number of the afterimage compensation frames may be set as ten, for example. In an embodiment, when the ratio (PDCR) of the number of the data changed pixels to the number of all pixels of the second static image is equal to or greater than about 23% and less than about 35%, the number of the afterimage compensation frames may be set as 15, for example, for example. In an embodiment, when the ratio (PDCR) of the number of the data changed pixels to the number of all pixels of the second static image is equal to or greater than about 35% and less than about 50%, the number of the afterimage compensation frames may be set as 30, for example. In an embodiment, when the ratio (PDCR) of the number of the data changed pixels to the number of all pixels of the second static image is equal to or greater than about 50%, the number of the afterimage compensation frames may be set as 60, for example.

The numbers of the afterimage compensation frames of FIG. 4 are only examples, the invention may not be limited to the number of the afterimage compensation frames.

The compensation frame generator 240 may insert plural afterimage compensation frames between normal frames of the second data signal LDATA1 in a single low frequency driving cycle to generate a third data signal LDATA2 (operation S600).

In an embodiment, the compensation frame generator 240 may insert the afterimage compensation frames corresponding to the determined number of the afterimage compensation frames in a single low frequency driving cycle between a first normal frame corresponding to the first static image of the second data signal LDATA1 and a second normal frame corresponding to the second static image of the second data signal LDATA1 to generate the third data signal LDATA2, for example.

When the input image data IMG represent the static image and the image transition of the input image data IMG does not occur, the compensation frame generator 240 may generate the second data signal LDATA1 as the third data signal LDATA2.

The compensation frame generator 240 outputs the third data signal LDATA2 to the data driver 500.

As shown in FIG. 5, when the input image data IMG represent a moving image, the display panel 100 may be driven using the first data signal HDATA having the high driving frequency. The display panel 100 may be scanned once in a high frequency driving cycle HT by the first data signal HDATA. When the display panel 100 is driven in the high driving frequency, the display image of the display panel 100 is refreshed in a short cycle HT so that the afterimage due to the image transition may not be generated. When the high driving frequency is about 60 Hz, the high frequency driving cycle HT may be about $\frac{1}{60}$ second.

When the input image data IMG represent a static image, the low frequency driver 220 generates the second data signal LDATA1 having the low driving frequency. The display panel 100 may be scanned once in a low frequency driving cycle (e.g. LT1, LT2, LT3 and LT4) by the second data signal LDATA1.

When the image transition of the input image data IMG does not occur, the compensation frame generator 240 generates the second data signal LDATA1 as the third data signal LDATA2 (e.g. corresponding to a first low frequency driving cycle LT1 and a second low frequency driving cycle LT2) without inserting the compensation frames.

When the image transition of the input image data IMG occurs, the compensation frame generator 240 inserts the plural afterimage compensation frames CF1 to CF6 in a single low frequency driving cycle between the normal frames NF2 and NF4 to generate the third data signal LDATA2 (e.g. corresponding to a third low frequency driving cycle LT3). In FIG. 5, six afterimage compensation frames may be inserted between the normal frames.

When the low driving frequency is about 1 Hz, the low frequency driving cycle (e.g. LT1, LT2, LT3 and LT4) may be one second. In an embodiment, when the afterimage compensation frames are not inserted between the normal frames despite of the image transition, an instantaneous afterimage may be shown to a user for one second when a first scanning of the display panel 100 occurs, for example.

In addition, the instantaneous afterimage may not be completely removed in 1-2 second intervals when a second scanning of the display panel 100 occurs. When the instantaneous afterimage is removed when a third scanning of the display panel 100 occurs, the instantaneous afterimage may be shown to a user for about 2 seconds or more so that the display quality of the display panel 100 may be deteriorated.

In the illustrated embodiment, six afterimage compensation frames CF1, CF2, CF3, CF4, CF5 and CF6 are inserted in a third low frequency driving cycle when the image transition occurs. A driving cycle of the afterimage compensation frames CF1, CF2, CF3, CF4, CF5 and CF6 may be same as a high frequency driving cycle (e.g. HT) of the first data signal HDATA. In an embodiment, when the instantaneous afterimage due to the image transition is removed to some extent when the image is refreshed for three times and the instantaneous afterimage due to the image transition is completely removed when the image is refreshed for six times, the afterimage may occur only for a time of about $\frac{1}{20}$ second to about $\frac{1}{10}$ second or less in the third low frequency driving cycle LT3, so that the afterimage may not be well recognized by an observer as described above, for example.

Thus, when the image transition occurs, the afterimage compensation frames CF1, CF2, CF3, CF4, CF5 and CF6 having the high driving frequency may be inserted so that the afterimage may be removed. Thus, the display quality of the display panel 100 may be enhanced.

In the illustrated embodiment, the display panel 100 may be an organic light emitting display panel including an organic light emitting element. In the organic light emitting display panel, a polarity inversion driving method may not be desired so that the number of the afterimage compensation frames may be determined using the first static image data and the second static image data.

Although not shown in drawing figures, the driving controller 200 may further include an image compensator. The image compensator may compensate the grayscale value of the input image data IMG and rearranges the compensated input image data corresponding to a data type of the data driver 500.

The image compensator may be disposed prior to the low frequency driver 220 and transmit the compensated input image data to the low frequency driver 220. In an alternative embodiment, the image compensator may be disposed after the low frequency driver 220 and the compensation frame generator 240, receive the data signal HDATA and LDATA2 from the compensation frame generator 240, compensate the data signal HDATA and LDATA2 and output the compensated data signal to the data driver 500.

In an embodiment, the image compensator may include a color characteristic compensator (not shown) and a dynamic capacitance compensator, for example.

The color characteristic compensator may receive the grayscale data of the input image data IMG and operate an adaptive color correction ("ACC"). The color characteristic compensator may compensate the grayscale data using a gamma curve.

The dynamic capacitance compensator may operate a dynamic capacitance compensation ("DCC") which compensates the grayscale data of a current frame data using a previous frame data and the current frame data.

Although not shown in drawing figures, the driving controller 200 may further include a signal generator.

The signal generator receives the input control signal CONT. The signal generator generates the first control signal CONT1 to control a driving timing of the gate driver 300 and the second control signal CONT2 to control a driving timing of the data driver 500 based on the input control signal CONT and the driving frequency. The signal generator generates the third control signal CONT3 to control a driving timing of the gamma reference voltage generator 400 based on the input control signal CONT and the driving frequency.

The signal generator outputs the first control signal CONT1 to the gate driver 300, the second control signal CONT2 to the data driver 500 and the third control signal CONT3 to the gamma reference voltage generator 400.

According to the illustrated embodiment, the driving frequency is determined according to the image displayed on the display panel 100 so that a power consumption of the display apparatus may be reduced. In addition, when the image transition of the input data signal occurs in the low frequency driving mode, a proper number of afterimage compensation frames may be inserted using the first static image data and the second static image data so that the afterimage may be effectively prevented. Thus, the display quality of the display panel 100 may be enhanced.

Figure 6:
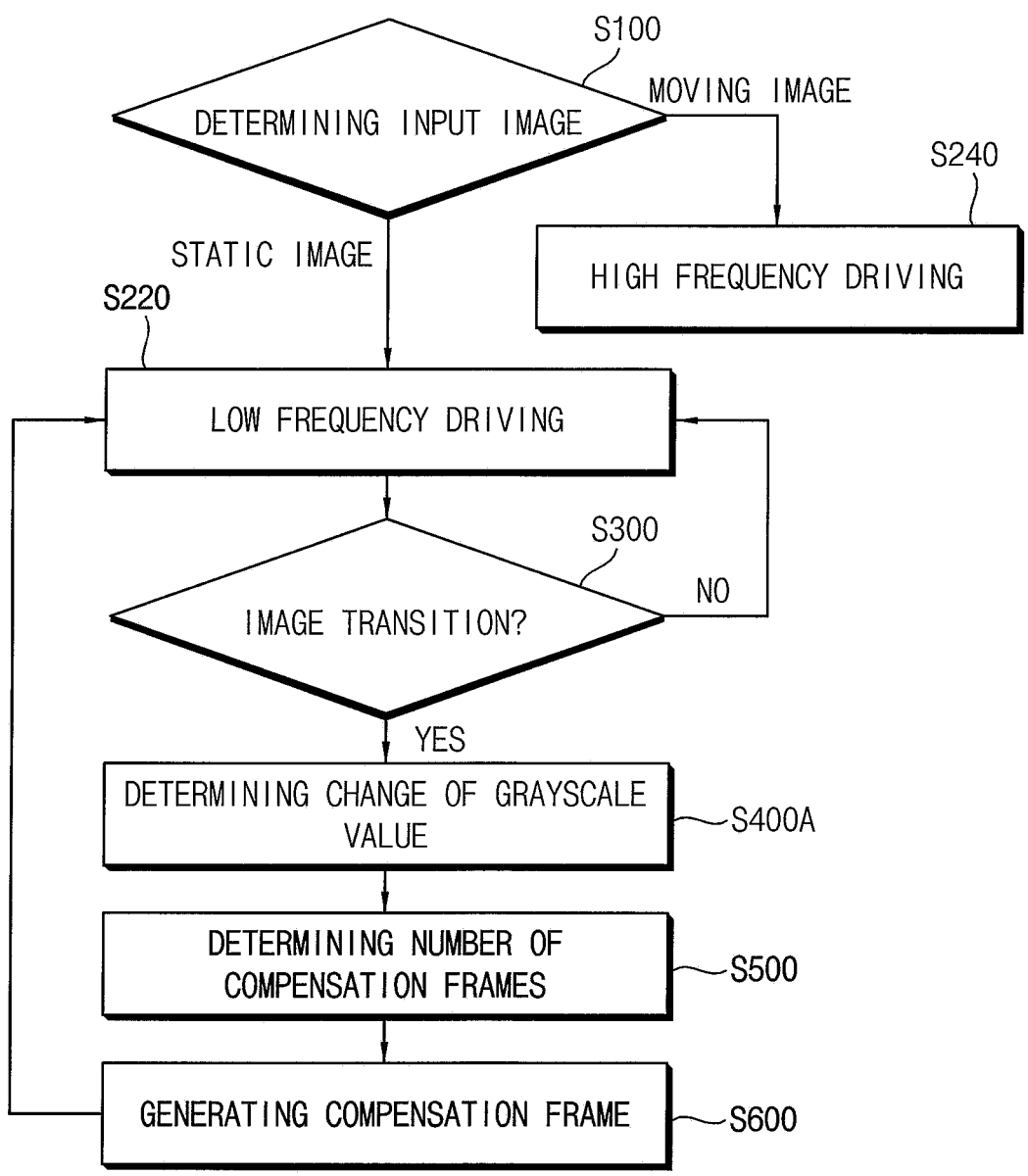
FIG. 6 is a flowchart diagram illustrating an embodiment of an operation of a driving controller of a display apparatus according to the invention.

FIG. 6 is a flowchart diagram illustrating an embodiment of an operation of a driving controller 200 of a display apparatus according to the invention. FIG. 7 is a table illustrating the number of compensation frames of the driving controller 200 of FIG. 6.

The method of driving the display panel and the display apparatus in the illustrated embodiment is substantially the same as the method of driving the display panel and the display apparatus of the previous embodiment explained referring to FIGS. 1 to 5 except for the method of determining the number of the afterimage compensation frames. Thus, the same reference numerals will be used to refer to the same or like parts as those described in the previous embodiment of FIGS. 1 to 5 and any repetitive explanation concerning the above elements will be omitted.

Referring to FIGS. 1, 2 and 5 to 7, the display apparatus includes a display panel 100 and a panel driver. The panel driver includes a driving controller 200, a gate driver 300, a gamma reference voltage generator 400 and a data driver 500.

The driving controller 200 generates the data signal HDATA/LDATA2 based on the input image data IMG. The driving controller 200 outputs the data signal HDATA/LDATA2 to the data driver 500.

The driving controller 200 may determine whether the input image data IMG represent a moving image or a static image. The driving controller 200 may determine whether an image transition of the input image data IMG occurs.

The driving controller 200 may determine a driving frequency of the display panel 100 according to the moving image or the static image. The driving controller 200 may insert an afterimage compensation frame when the input image data IMG represent a static image and an image transition of the input image data IMG occurs.

The low frequency driver 220 determines whether the input image data IMG represent a moving image or a static image (operation S100).

When the input image data IMG represent a moving image, the low frequency driver 220 generates a first data signal HDATA having a high driving frequency and outputs the first data signal HDATA to the data driver 500 (operation S240). In an embodiment, the high driving frequency may be about 60 Hz, for example. In an alternative embodiment, the high driving frequency may be about 120 Hz. In an alternative embodiment, the high driving frequency may be about 240 Hz.

When the input image data IMG represent a static image, the low frequency driver 220 generates a second data signal LDATA1 having a low driving frequency and outputs the second data signal LDATA1 to the compensation frame generator 240 (operation S220). In an embodiment, the low driving frequency may be about 1 Hz, for example. In an alternative embodiment, the low driving frequency may be about 10 Hz. In an alternative embodiment, the low driving frequency may be about 30 Hz.

When the input image data IMG represent a static image, the compensation frame generator 240 determines whether the image transition of the input data signal occurs (operation S300). In an embodiment, the compensation frame generator 240 may determine whether the image transition of the input data signal occurs from a first static image to a second static image, for example. The second static image may be a current static image. The first static image may be a previous static image which is immediately preceding the current static image.

When the input image data IMG represent a static image and the image transition of the input image data IMG occurs, the compensation frame generator 240 determines the number of afterimage compensation frames using the first static image data and the second static image data.

In the illustrated embodiment, the compensation frame generator 240 may determine a change of the grayscale value of the first static image and the grayscale value of the second static image (operation S400A). The compensation frame generator 240 compares grayscale data of all pixels of the first static image to grayscale data of all pixels of the second static image. When the grayscale data of the first static image and the grayscale data of the second static image which are correspond to each other have different values, the difference between the grayscale value of the first static image and the grayscale value of the second static image may be determined.

The compensation frame generator 240 may calculate a first average DM1 of the difference between the grayscale value of the first static image and the grayscale value of the second static image for the data changed pixels of the second static image compared to the first static image.

In an embodiment, when the data changed pixels of the second static image compared to the first static image are ten, and the differences between the grayscale value of the first static image and the grayscale value of the second static image are respectively 10, 20, 30, 40, 50, 60, 70, 80, 90 and 100, the first average DM1 may be 55, for example.

The first average DM1 may be an index for determining the amount of grayscale change between the immediately previous static image data and the current static image data. As the change (e.g. DM1) of the grayscale value of the first static image and the grayscale value of the second static image is great, the number of the afterimage compensation frames may be great.

The compensation frame generator 240 may calculate a second average DM10 of the difference between the grayscale value of the current static image and the grayscale values of adjacent previous static images for the data changed pixels of the current static image compared to adjacent previous static images from the current static image. In the embodiment, the compensation frame generator 240 may calculate the second average DM10 of the difference between the grayscale value of the current static image and the grayscale values of ten adjacent previous static images from the current static image.

In an embodiment, when the difference between the grayscale value of the current static image and the grayscale value of a first previous static image which is immediately previous from the current static image is 55, the difference between the grayscale value of the first previous static image and the grayscale value of a second previous static image which is immediately previous from the first previous static image is 45, the difference between the grayscale value of the second previous static image and the grayscale value of a third previous static image which is immediately previous from the second previous static image is 35, the difference between the grayscale value of the third previous static image and the grayscale value of a fourth previous static image which is immediately previous from the third previous static image is 25, the difference between the grayscale value of the fourth previous static image and the grayscale value of a fifth previous static image which is immediately previous from the fourth previous static image is 15, the difference between the grayscale value of the fifth previous static image and the grayscale value of a sixth previous static image which is immediately previous from the fifth previous static image is 0, the difference between the grayscale value of the sixth previous static image and the grayscale value of a seventh previous static image which is immediately previous from the sixth previous static image is 0, the difference between the grayscale value of the seventh previous static image and the grayscale value of an eighth previous static image which is immediately previous from the seventh previous static image is 0, the difference between the grayscale value of the eighth previous static image and the grayscale value of a ninth previous static image which is immediately previous from the eighth previous static image is 0, and the difference between the grayscale value of the ninth previous static image and the grayscale value of a tenth previous static image which is immediately previous from the ninth previous static image is 0, the second average (e.g. DM10) may be 17.5, for example.

The second average DM2 may be an index for determining the amount of grayscale change between two adjacent static image data in the adjacent plural previous static image data from the current static image data. The great second average DM2 may mean that the afterimage compensation has already been applied in several frames. Accordingly, when the second average DM2 is great, it may mean that the need for afterimage compensation is relatively small.

The compensation frame generator 240 may determine the number of the afterimage compensation frames using the change of the grayscale values between the first static image and the second static image (operation S500).

As the change of the grayscale value of the first static image and the grayscale value of the second static image is great, the number of the afterimage compensation frames may be great.

In an embodiment, the compensation frame generator 240 may determine the number of the afterimage compensation frames using an absolute value |DM1−DM10| of a difference between the first average DM1 and the second average DM10, for example.

FIG. 7 represents an example of the number of the afterimage compensation frames according to the absolute value |DM1−DM10| of a difference between the first average and the second average.

In an embodiment, when the absolute value |DM1−DM10| of the difference between the first static image and the second static image is less than 15, the number of the afterimage compensation frames may be set as six, for example. In an embodiment, when the absolute value |DM1−DM10| of the difference between the first static image and the second static image is equal to or greater than 15 and less than 40, the number of the afterimage compensation frames may be set as ten, for example. In an embodiment, when the absolute value |DM1−DM10| of the difference between the first static image and the second static image is equal to or greater than 40 and less than 80, the number of the afterimage compensation frames may be set as 15, for example. In an embodiment, when the absolute value |DM1−DM10| of the difference between the first static image and the second static image is equal to or greater than 80 and less than 150, the number of the afterimage compensation frames may be set as 30, for example. In an embodiment, when the absolute value |DM1−DM10| of the difference between the first static image and the second static image is equal to or greater than 150, the number of the afterimage compensation frames may be set as 60, for example.

The numbers of the afterimage compensation frames of FIG. 7 are only examples, the invention may not be limited to the number of the afterimage compensation frames.

The compensation frame generator 240 may insert plural afterimage compensation frames between normal frames of the second data signal LDATA1 in a single low frequency driving cycle to generate a third data signal LDATA2 (operation S600).

According to the illustrated embodiment, the driving frequency is determined according to the image displayed on the display panel 100 so that a power consumption of the display apparatus may be reduced. In addition, when the image transition of the input data signal occurs in the low frequency driving mode, a proper number of afterimage compensation frames may be inserted using the first static image data and the second static image data so that the afterimage may be effectively prevented. Thus, the display quality of the display panel 100 may be enhanced.

Figure 8:
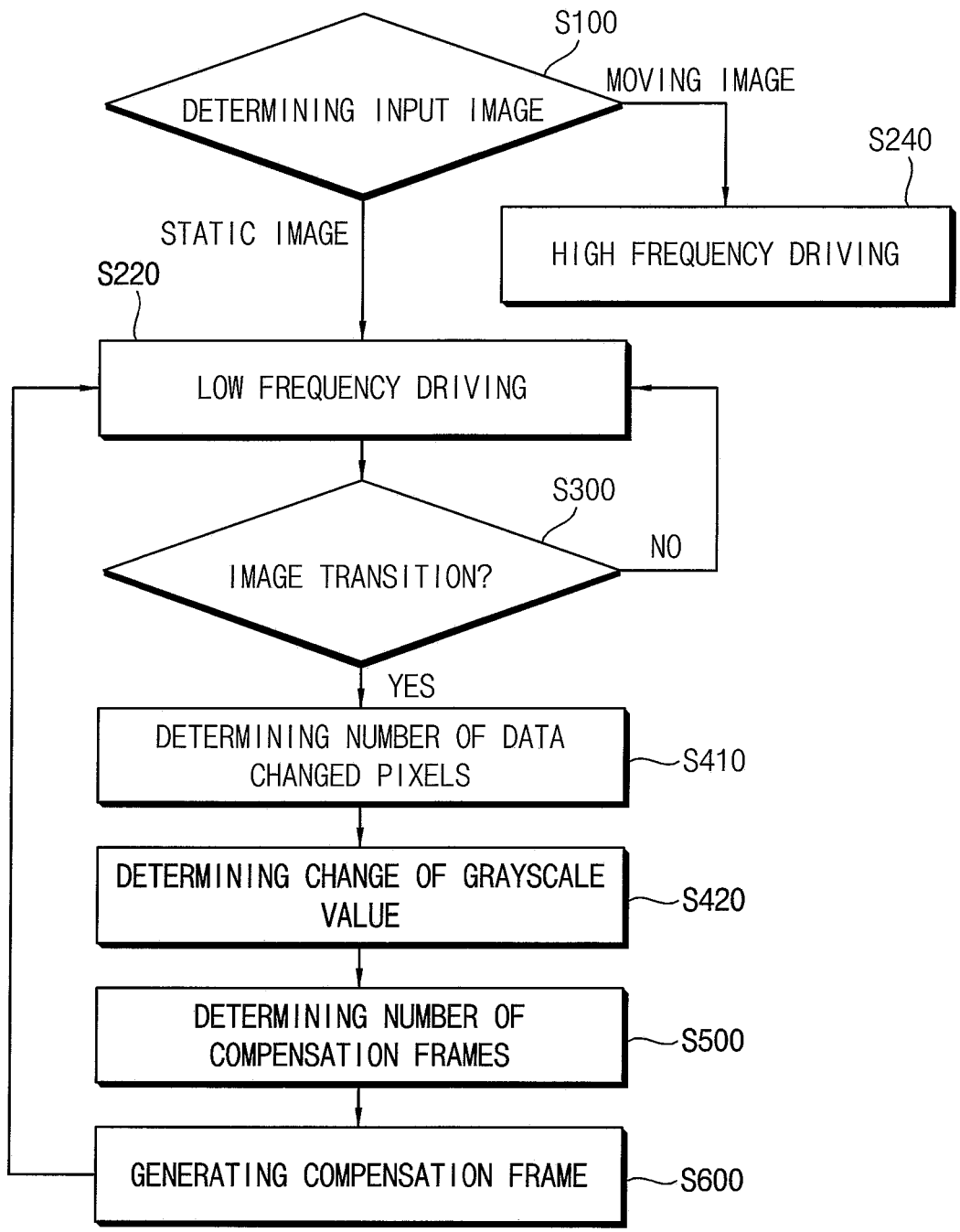
FIG. 8 is a flowchart diagram illustrating an embodiment of an operation of a driving controller of a display apparatus according to the invention.

FIG. 8 is a flowchart diagram illustrating an embodiment of an operation of a driving controller 200 of a display apparatus according to the invention. FIG. 9 is a table illustrating the number of compensation frames of the driving controller 200 of FIG. 8.

The method of driving the display panel and the display apparatus in the illustrated embodiment is substantially the same as the method of driving the display panel and the display apparatus of the previous embodiment explained referring to FIGS. 1 to 5 except for the method of determining the number of the afterimage compensation frames. Thus, the same reference numerals will be used to refer to the same or like parts as those described in the previous embodiment of FIGS. 1 to 5 and any repetitive explanation concerning the above elements will be omitted.

Referring to FIGS. 1, 2, 5, 8 to 9, the display apparatus includes a display panel 100 and a panel driver. The panel driver includes a driving controller 200, a gate driver 300, a gamma reference voltage generator 400 and a data driver 500.

The driving controller 200 generates the data signal HDATA/LDATA2 based on the input image data IMG. The driving controller 200 outputs the data signal HDATA/LDATA2 to the data driver 500.

The driving controller 200 may determine whether the input image data IMG represent a moving image or a static image. The driving controller 200 may determine whether an image transition of the input image data IMG occurs.

The driving controller 200 may determine a driving frequency of the display panel 100 according to the moving image or the static image. The driving controller 200 may insert an afterimage compensation frame when the input image data IMG represent a static image and an image transition of the input image data IMG occurs.

The low frequency driver 220 determines whether the input image data IMG represent a moving image or a static image (operation S100).

When the input image data IMG represent a moving image, the low frequency driver 220 generates a first data signal HDATA having a high driving frequency and outputs the first data signal HDATA to the data driver 500 (operation S240). In an embodiment, the high driving frequency may be about 60 Hz, for example. In an alternative embodiment, the high driving frequency may be about 120 Hz. In an alternative embodiment, the high driving frequency may be about 240 Hz.

When the input image data IMG represent a static image, the low frequency driver 220 generates a second data signal LDATA1 having a low driving frequency and outputs the second data signal LDATA1 to the compensation frame generator 240 (operation S220). In an embodiment, the low driving frequency may be about 1 Hz, for example. In an alternative embodiment, the low driving frequency may be about 10 Hz, for example. In an alternative embodiment, the low driving frequency may be about 30 Hz, for example. When the input image data IMG represent a static image, the compensation frame generator 240 determines whether the image transition of the input data signal occurs (operation S300). In an embodiment, the compensation frame generator 240 may determine whether the image transition of the input data signal occurs from a first static image to a second static image, for example. The second static image may be a current static image. The first static image may be a previous static image which is immediately preceding the current static image.

When the input image data IMG represent a static image and the image transition of the input image data IMG occurs, the compensation frame generator 240 determines the number of afterimage compensation frames using the first static image data and the second static image data.

In the illustrated embodiment, the compensation frame generator 240 may determine the number of data changed pixels of the second static image compared to the first static image among all of the pixels of the second static image (operation S410). The compensation frame generator 240 compares grayscale data of all pixels of the first static image to grayscale data of all pixels of the second static image. When the grayscale data of the first static image and the grayscale data of the second static image which are correspond to each other have the same value, the pixel of the second static image may not be determined as the data changed pixel. When the grayscale data of the first static image and the grayscale data of the second static image which are correspond to each other have different values, the pixel of the second static image may be determined as the data changed pixel.

In addition, the compensation frame generator 240 may determine a change of the grayscale value of the first static image and the grayscale value of the second static image (operation S420). The compensation frame generator 240 compares grayscale data of all pixels of the first static image to grayscale data of all pixels of the second static image. When the grayscale data of the first static image and the grayscale data of the second static image which are correspond to each other have different values, the difference between the grayscale value of the first static image and the grayscale value of the second static image may be determined.

The compensation frame generator 240 may calculate a first average DM1 of the difference between the grayscale value of the first static image and the grayscale value of the second static image for the data changed pixels of the second static image compared to the first static image.

The compensation frame generator 240 may calculate a second average DM10 of the difference between the grayscale value of the current static image and the grayscale values of adjacent previous static images for the data changed pixels of the current static image compared to adjacent previous static images from the current static image.

The compensation frame generator 240 may determine the number of the afterimage compensation frames using the number of the data changed pixels and the change of the grayscale values between the first static image and the second static image (operation S500).

The compensation frame generator 240 may determine an initial number compensation frames using the number of the data changed pixels of the second static image. The compensation frame generator 240 may determine a compensation factor based on the change of the grayscale values between the first static image and the second static image.

FIG. 9 represents an example of the initial number of the compensation frames according to the ratio (PDCR) of the number of the data changed pixels to the number of all pixels of the second static image.

In an embodiment, when the ratio (PDCR) of the number of the data changed pixels to the number of all pixels of the second static image is less than about 10%, the initial number of the compensation frames may be set as six, for example. In an embodiment, when the ratio (PDCR) of the number of the data changed pixels to the number of all pixels of the second static image is equal to or greater than about 10% and less than about 23%, the initial number of the compensation frames may be set as ten, for example. In an embodiment, when the ratio (PDCR) of the number of the data changed pixels to the number of all pixels of the second static image is equal to or greater than about 23% and less than about 35%, the initial number of the compensation frames may be set as 15, for example. In an embodiment, when the ratio (PDCR) of the number of the data changed pixels to the number of all pixels of the second static image is equal to or greater than about 35% and less than about 50%, the initial number of the compensation frames may be set as 30, for example. In an embodiment, when the ratio (PDCR) of the number of the data changed pixels to the number of all pixels of the second static image is equal to or greater than about 50%, the initial number of the compensation frames may be set as 60, for example.

FIG. 9 represents an example of the compensation factor according to the absolute value |DM1–DM10| of the difference between the first average and the second average.

In an embodiment, when the absolute value |DM1–DM10| of the difference between the first static image and the second static image is less than 15, the compensation factor may be set as 1, for example. In an embodiment, when the absolute value |DM1–DM10| of the difference between the first static image and the second static image is equal to or greater than 15 and less than 40, the compensation factor may be set as 1.1, for example. In an embodiment, when the absolute value |DM1–DM10| of the difference between the first static image and the second static image is equal to or greater than 40 and less than 80, the compensation factor may be set as 1.2, for example. In an embodiment, when the absolute value |DM1–DM10| of the difference between the first static image and the second static image is equal to or greater than 80 and less than 150, the compensation factor may be set as 1.35, for example. In an embodiment, when the absolute value |DM1−DM10| of the difference between the first static image and the second static image is equal to or greater than 150, the compensation factor may be set as 1.5, for example.

The compensation frame generator 240 may determine a final number of compensation frames by multiplying the initial number of the compensation frames by the compensation factor and rounding decimals to the nearest whole number. In the illustrated embodiment, the high driving frequency may be about 60 Hz. Accordingly, the final number of the compensation frames may not exceed 60. In an embodiment, the final number of the compensation frames may be 60 when a value calculated by multiplying the initial number of the compensation frames by the compensation factor exceeds 60, for example.

In an alternative embodiment, the compensation frame generator 240 may determine the final number of the compensation frames by adding the compensation factor to the initial number of the compensation frames. In this case, the compensation factor may not be a weight as shown in FIG. 9 but be an added number of compensation frames.

According to the embodiment, the driving frequency is determined according to the image displayed on the display panel 100 so that a power consumption of the display apparatus may be reduced. In addition, when the image transition of the input data signal occurs in the low frequency driving mode, a proper number of afterimage compensation frames may be inserted using the first static image data and the second static image data so that the afterimage may be effectively prevented. Thus, the display quality of the display panel 100 may be enhanced.

According to the method of driving the display panel and the display apparatus for performing the method of the invention as explained above, the power consumption of the display apparatus may be reduced and the display quality of the display panel may be enhanced.

Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims.

The invention claimed is:

1. A method of driving a display panel, the method comprising:
   determining whether an input data signal represents a moving image or a static image;
   determining an image transition from a first static image to a second static image when the input data signal represents the static image;
   determining a number of afterimage compensation frames using data of the first static image and data of the second static image when the image transition occurs; and
   inserting the afterimage compensation frames corresponding to a determined number of the afterimage compensation frames in a single low frequency driving cycle between a first normal frame corresponding to the first static image and a second normal frame corresponding to the second static image.

2. The method of claim 1, wherein the number of the afterimage compensation frames is determined using a number of data changed pixels of the second static image compared to the first static image among all of pixels of the second static image.

3. The method of claim 2, wherein as the number of the data changed pixels is great, the number of the afterimage compensation frames is great.

4. The method of claim 1, wherein the number of the afterimage compensation frames is determined using a change of grayscale values between the first static image and the second static image.

5. The method of claim 4, wherein as the change of grayscale values between the first static image and the second static image is great, the number of the afterimage compensation frames is great.

6. The method of claim 4, wherein the number of the afterimage compensation frames is determined using a first average of a difference between a grayscale value of the first static image and a grayscale value of the second static image for data changed pixels of the second static image compared to the first static image.

7. The method of claim 6, wherein the number of the afterimage compensation frames is determined further using a second average of a difference between a grayscale value of a current static image and grayscale values of adjacent previous static images for data changed pixels of the current static image compared to the adjacent previous static images from the current static image.

8. The method of claim 7, wherein the number of the afterimage compensation frames is determined using an absolute value of a difference between the first average and the second average.

9. The method of claim 1, wherein the number of the afterimage compensation frames is determined using a number of data changed pixels of the second static image compared to the first static image among all of pixels of the second static image and a change of grayscale values between the first static image and the second static image.

10. The method of claim 9, wherein the determining the number of the afterimage compensation frames comprises:
    determining an initial number of compensation frames based on the number of the data changed pixels of the second static image; and
    determining a compensation factor based on the change of the grayscale values between the first static image and the second static image.

11. The method of claim 10, wherein the determining the number of the afterimage compensation frames further comprises multiplying the initial number of the compensation frames by the compensation factor to determine a final number of compensation frames.

12. The method of claim 10, wherein the determining the number of the afterimage compensation frames further comprises adding the compensation factor to the initial number of the compensation frames to determine a final number of compensation frames.

13. A display apparatus comprising:
    a display panel which displays an image;
    a driving controller which determines whether an input data signal represents a moving image or a static image, determines an image transition from a first static image to a second static image when the input data signal represents the static image, determines a number of afterimage compensation frames using data of the first static image and data of the second static image when the image transition occurs and inserts the afterimage compensation frames corresponding to a determined number of the afterimage compensation frames in a single low frequency driving cycle between a first normal frame corresponding to the first static image and a second normal frame corresponding to the second static image; and a data driver which generates a data voltage based on the data signal and outputs the data voltage to the display panel.

14. The display apparatus of claim 13, wherein the driving controller comprises:

a low frequency driver which generates a first data signal having a high driving frequency when the input data signal represents the moving image and generates a second data signal having a low driving frequency when the input data signal represents the static image; and a compensation frame generator which inserts the afterimage compensation frames corresponding to the determined number of the afterimage compensation frames in the single low frequency driving cycle between the first normal frame and the second normal frame and generates a third data signal when the input data signal represents the static image and the image transition occurs.

15. The display apparatus of claim 13, wherein the driving controller determines the number of the afterimage compensation frames using a number of data changed pixels of the second static image compared to the first static image among all of pixels of the second static image.

16. The display apparatus of claim 15, wherein as the number of the data changed pixels is great, the number of the afterimage compensation frames is great.

17. The display apparatus of claim 13, wherein the driving controller determines the number of the afterimage compensation frames using a change of grayscale values between the first static image and the second static image.

18. The display apparatus of claim 17, wherein as the change of the grayscale values between the first static image and the second static image is great, the number of the afterimage compensation frames is great.

19. The display apparatus of claim 13, wherein the driving controller determines the number of the afterimage compensation frames using a number of data changed pixels of the second static image compared to the first static image among all of pixels of the second static image and a change of grayscale values between the first static image and the second static image.

20. The display apparatus of claim 19, wherein the driving controller determines an initial number of compensation frames based on the number of the data changed pixels of the second static image and a compensation factor based on the change of the grayscale values between the first static image and the second static image.

* * * * *